US010457226B2

(12) United States Patent
Davies et al.

(10) Patent No.: US 10,457,226 B2
(45) Date of Patent: Oct. 29, 2019

(54) ACOUSTICAL ABSORBER HAVING A BODY AND AT LEAST ONE SERRATED WASHER

(71) Applicant: FORD GLOBAL TECHNOLOGIES, LLC, Dearborn, MI (US)

(72) Inventors: Bryn Arthur Davies, Novi, MI (US); Raghu Puttaiah, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/217,545

(22) Filed: Jul. 22, 2016

(65) Prior Publication Data

US 2018/0022298 A1 Jan. 25, 2018

(51) Int. Cl.

*B60R 13/08* (2006.01)
*F16B 39/24* (2006.01)
*F02B 77/13* (2006.01)
*F16F 7/00* (2006.01)
*G10K 11/162* (2006.01)
*B60R 13/00* (2006.01)
*F16B 39/00* (2006.01)

(52) U.S. Cl.

CPC .......... *B60R 13/0838* (2013.01); *B60R 13/08* (2013.01); *F16B 39/24* (2013.01); *F16F 7/00* (2013.01); *G10K 11/162* (2013.01); *B60G 2600/44* (2013.01); *B60R 2013/0807* (2013.01)

(58) Field of Classification Search

CPC ............ B60R 13/0838; B60R 13/0815; B60R 2013/0807; F16B 39/24; F02B 77/13
USPC ......................................... 181/207, 204, 205
See application file for complete search history.

(56) References Cited

U.S. PATENT DOCUMENTS 746,006 A * 12/1903 Brigham ................. F16B 43/00 16/42 R
1,037,010 A * 8/1912 Irons ..................... G09F 3/0352 16/2.2
3,365,761 A * 1/1968 Kalvig ..................... B25H 3/04 211/65
3,694,013 A * 9/1972 Heitner ............... E04D 13/0305 52/200
4,358,098 A 11/1982 Ceseri
4,456,092 A * 6/1984 Kubozuka ............... F02B 77/13 181/204
5,243,153 A * 9/1993 Holwerda ............ F16F 1/3732 181/208

(Continued)

FOREIGN PATENT DOCUMENTS

DE 102010019545 A1 12/2010
DE 102011109694 A1 2/2013

(Continued)

OTHER PUBLICATIONS

English Machine Translation of EP0620074B2.

(Continued)

*Primary Examiner* — Edgardo San Martin
(74) *Attorney, Agent, or Firm* — Vichit Chea; King & Schickli, PLLC

(57) ABSTRACT

An acoustical absorber, which may take the form of a shock tower insulator, includes a body made from a sound insulating material and one or more serrated washers fixed to the body. The washers function to retain the body to mounting studs without the need for using a separate fastener.

16 Claims, 5 Drawing Sheets

10 12 14 16 24 32 38 40 A

(56) References Cited

U.S. PATENT DOCUMENTS

| | | | | | |
|---|---|---|---|---|---|
| 5,824,974 | A * | 10/1998 | Campbell | B60R 13/08 | 181/290 |
| 5,839,868 | A * | 11/1998 | Kloian | F16B 21/16 | 411/533 |
| 6,681,890 | B1 * | 1/2004 | Chen | F01N 13/102 | 165/135 |
| 6,926,537 | B1 * | 8/2005 | Auchincloss | H01R 12/62 | 439/67 |
| 6,932,223 | B1 * | 8/2005 | Lee | B25H 3/04 | 206/349 |
| 7,273,128 | B2 * | 9/2007 | Niwa | B60R 13/0876 | 181/207 |
| 7,282,646 | B2 * | 10/2007 | Neujahr | H02G 3/30 | 174/135 |
| 7,441,533 | B1 * | 10/2008 | Miller | F02F 7/006 | 123/198 E |
| 7,749,590 | B2 * | 7/2010 | Shiga | C09J 7/22 | 428/136 |
| 8,118,526 | B2 * | 2/2012 | Dowling | F16B 5/02 | 411/533 |
| 8,291,698 | B2 * | 10/2012 | Hikami | F01N 13/102 | 181/200 |
| 9,068,585 | B2 * | 6/2015 | Kuehn | F16B 21/20 | |
| 2005/0133302 | A1 * | 6/2005 | Pfaffelhuber | B60R 13/08 | 181/293 |
| 2006/0193714 | A1 | 8/2006 | Werner | | |
| 2007/0154682 | A1 | 7/2007 | Connelly et al. | | |
| 2013/0343829 | A1 | 12/2013 | Benedetti et al. | | |
| 2016/0369865 | A1 * | 12/2016 | Puttaiah | G10K 11/002 | |

FOREIGN PATENT DOCUMENTS

| | | | |
|---|---|---|---|
| EP | 0620074 | B2 | 11/2002 |
| WO | 2007019935 | A1 | 2/2007 |

OTHER PUBLICATIONS

English Machine Translation of DE102011109694A1.
English Machine Translation of DE102010019545A1.
English Machine Translation of WO2007019935A1.

* cited by examiner

10
A
30
32
36
40
16
12
14
38
24
34
22
12

ACOUSTICAL ABSORBER HAVING A BODY AND AT LEAST ONE SERRATED WASHER

TECHNICAL FIELD

This document relates generally to the motor vehicle equipment field and, more particularly, to an acoustical absorber, such as a shock tower insulator, that includes a body made from a sound insulating material and one or more serrated washers fixed to that body and adapted for mounting the acoustical absorber to a mounting stud or other structure in a proper operating position on the motor vehicle.

BACKGROUND

Acoustical absorbers are employed in any number of applications on a motor vehicle in order to control noise, vibration and harshness (NVH). One such application is as a shock tower insulator.

In the past, prior art insulators, such as the shock tower insulator previously mentioned, have been secured and positioned on a threaded stud by cooperating washers and nuts or, for example, on weld studs by means of a tinnerman clip. Any connection requiring separate fasteners, such as used in the prior art, also requires tool clearance to allow the installation of the fastener used to hold the prior art insulator in position. This tool clearance represents a limitation on designers and often complicates vehicle design.

This document relates to a new and improved acoustical absorber and shock tower insulator. Such an acoustical absorber and shock tower insulator includes one or more serrated washers, fixed to the body of the acoustical insulator, that function as a fastener, thereby eliminating the need for designers to maintain a tool clearance and freeing up that space for other purposes. This is a particularly advantageous result in the engine compartment where a number of different acoustic absorbers and insulators are utilized and limited space makes space considerations a very important design factor.

SUMMARY

In accordance with the purposes and benefits described herein, an acoustical absorber is provided. That acoustical absorber comprises a body made from a sound insulating material and a first serrated washer fixed to the body. The first serrated washer may be made from a composite material. That body may have a first material density $D_1$ and the first serrated washer may have a second material density $D_2$ where $D_1<D_2$.

The first serrated washer may be annular in shape. Further, the first serrated washer may include an inner margin having a plurality of spaced slits defining a plurality of spaced teeth encompassing a central aperture. In one of many possible embodiments, the first serrated washer includes four spaced slits defining four resilient teeth. Each of those resilient teeth may define an equal arc of the central aperture.

In other possible embodiments, the acoustical absorber includes a second serrated washer that is also fixed to the body. Further, the body may further include (a) a first mounting aperture aligned with the central aperture of the first serrated washer and (b) a second mounting aperture aligned with the second central aperture and the second serrated washer.

In accordance with an additional aspect, a shock tower insulator is provided. That shock tower insulator comprises a body made from a sound insulating material and including a first mounting aperture. The shock tower insulator also includes a first serrated washer fixed to the body around an entrance to the first mounting aperture.

Still further, the shock tower insulator may include a second serrated washer fixed to the body around a second entrance to a second mounting aperture in the body.

Both the first serrated washer and the second serrated washer may be made from a composite material. Further, the body may have a first material density $D_1$ while the first serrated washer and the second serrated washer both have a second material density $D_2$ where $D_1<D_2$.

The first serrated washer and the second serrated washer may both be annular in shape. In such embodiments, the first serrated washer may include a first inner margin having a first plurality of spaced teeth encompassing a first central aperture. Similarly, the second serrated washer may include a second inner margin having a second plurality of spaced teeth encompassing a second central aperture. In addition, the first central aperture may be aligned with the first mounting aperture while the second central aperture may be aligned with the second mounting aperture.

The body of the shock tower insulator, the first serrated washer and the second serrated washer may all be made from a polyester fiber material. In use, the first serrated washer and the second serrated washer retain the body of the shock tower insulator to a first mounting stud and a second mounting stud with the combined retention force of at least 44 Newtons.

Consistent with still another aspect, a serrated washer is provided. That serrated washer comprises a washer body made from a compressed composite material having a central aperture defined by a serrated margin. That serrated margin may include a plurality of slits defining a plurality of resilient teeth encompassing the central aperture.

In the following description, there are shown and described several preferred embodiments of the acoustical absorber, the shock tower insulator and the serrated washer fixed to the body of the acoustical absorber or shock tower insulator. As it should be realized, the acoustical absorber, the shock tower insulator and the washer are capable of other, different embodiments and their several details are capable of modification in various, obvious aspects all without departing from the acoustical absorber, shock tower insulator and the serrated washer as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the acoustical absorber, the shock tower insulator and the serrated washer and together with the description serve to explain certain principles thereof. In the drawing figures:

FIG. 1 is a top perspective view of an acoustical absorber, in the form of a shock tower insulator, constructed in accordance with the teachings of this document.

FIG. 2*a* is a detailed top plan view of a first serrated washer that is fixed to the body of the acoustical insulator or shock tower insulator by means of an adhesive.

FIG. 2*b* is a detailed top plan view of a second serrated washer that is fixed to the body of the acoustical insulator or shock tower insulator by means of an adhesive.

Reference will now be made in detail to the acoustical absorber/shock tower insulator illustrated in the accompanying drawing figures.

DETAILED DESCRIPTION

Reference is now made to FIGS. 1-4 illustrating the acoustical absorber 10 that is the subject matter of this document. In the illustrated embodiment, the acoustical absorber 10 comprises a shock tower insulator. It should be appreciated, however, that the shock tower insulator is just one possible embodiment/application of the acoustical absorber 10 and that the acoustical absorber should not be considered as being limited to a shock tower insulating application. As illustrated, the acoustical absorber 10 includes a body 12. That body 12 may be formed or molded from a sound insulating material. Thus, for some applications the acoustical absorber 10 may be made from a composite material comprising, for example, a polymer matrix material and reinforcing fibers. In one useful embodiment, the body 12 may be made from polyester fiber composite material.

Figure 1:
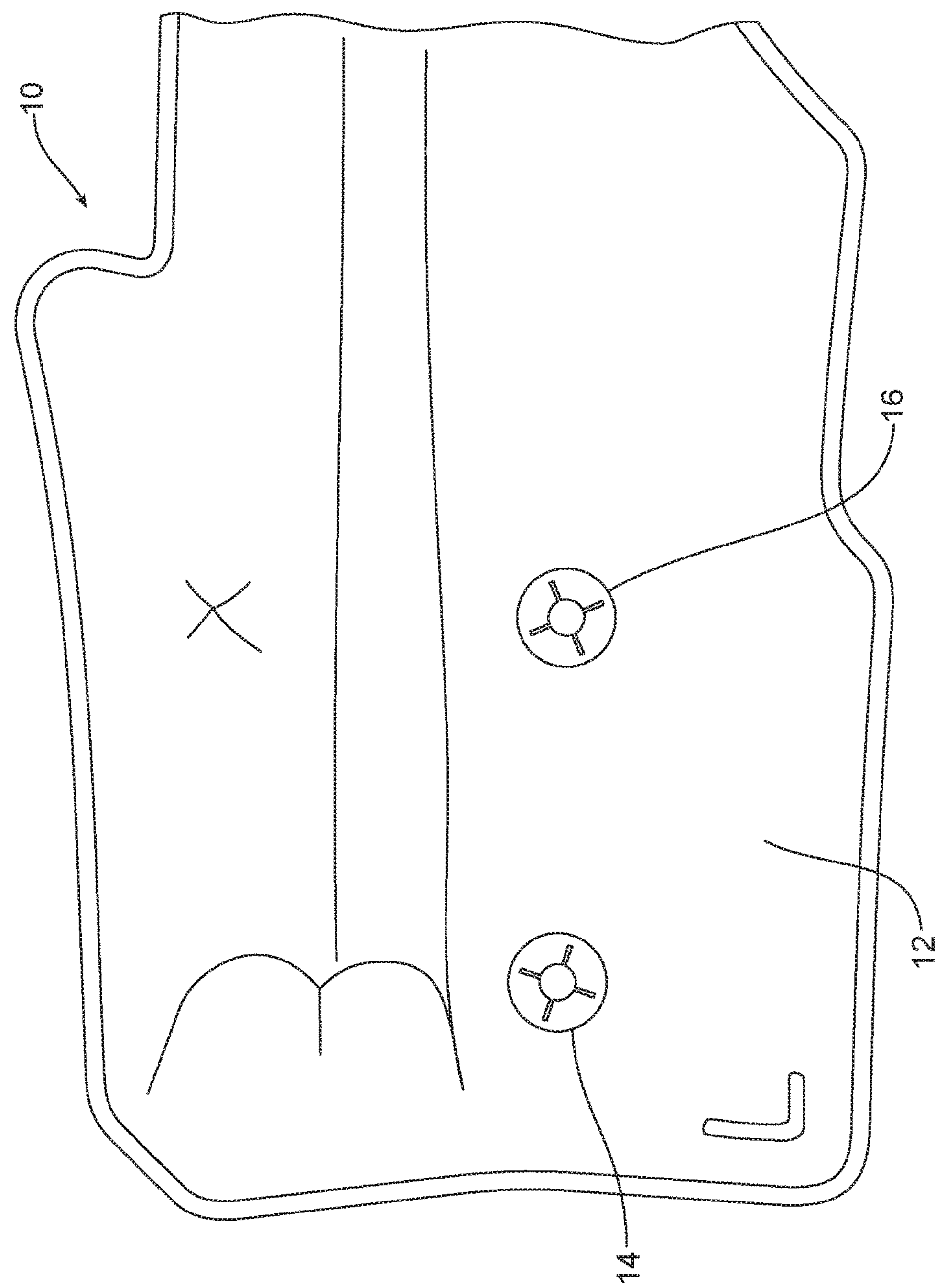

As further illustrated in FIG. 1, the acoustical absorber 10 includes a first serrated washer 14 and a second serrated washer 16. The first serrated washer 14 and the second serrated washer 16 may also be made from a composite material comprising, for example, a polymer matrix material and reinforcing fibers. In one useful embodiment, the first serrated washer 14 and the second serrated washer 16 may be made from a polyester fiber composite material.

In one of many possible embodiments, the body 12 has a first material density $D_1$ while the first serrated washer 14 and the second serrated washer 16 have a second material density $D_2$ where $D_1<D_2$. The increased density of the first serrated washer 14 and the second serrated washer 16 add strength to the material and increase the retention force provided to hold the acoustic absorber 10 in an operative position in a manner that will be described below.

Figure 2A:
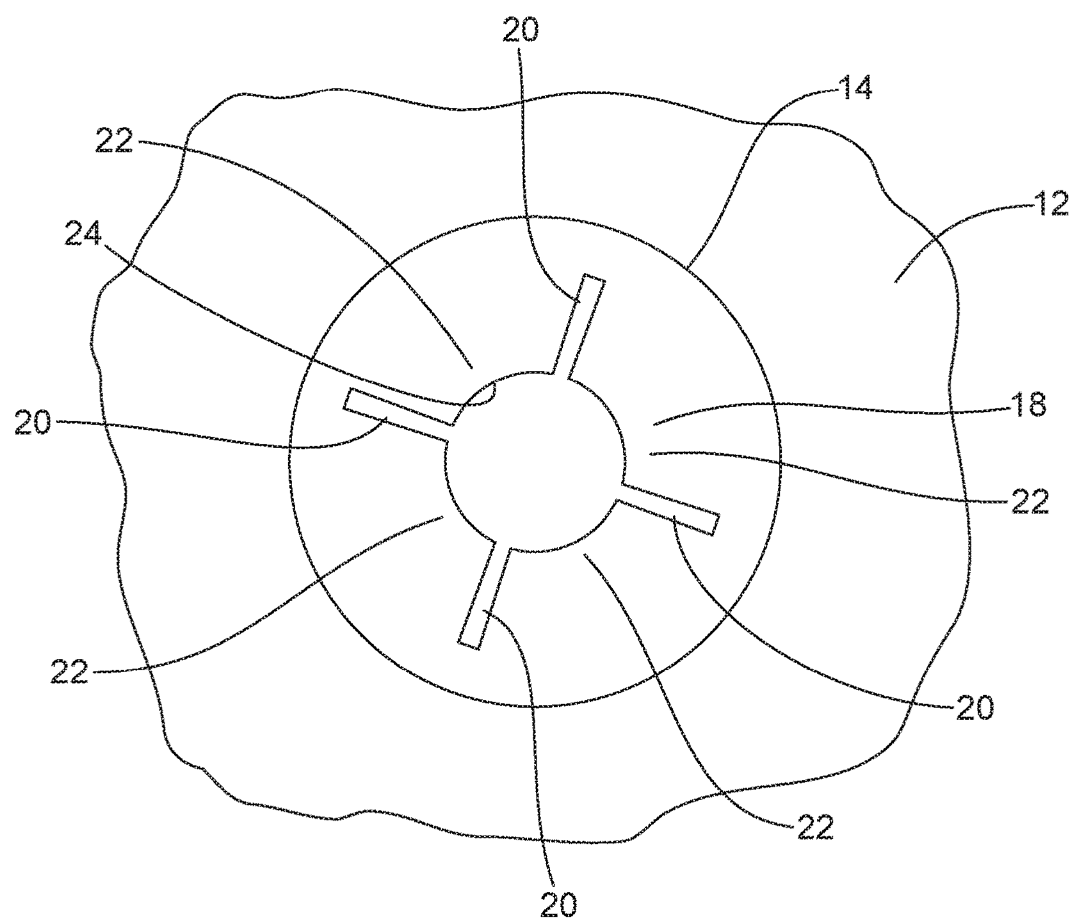
Figure 2B:
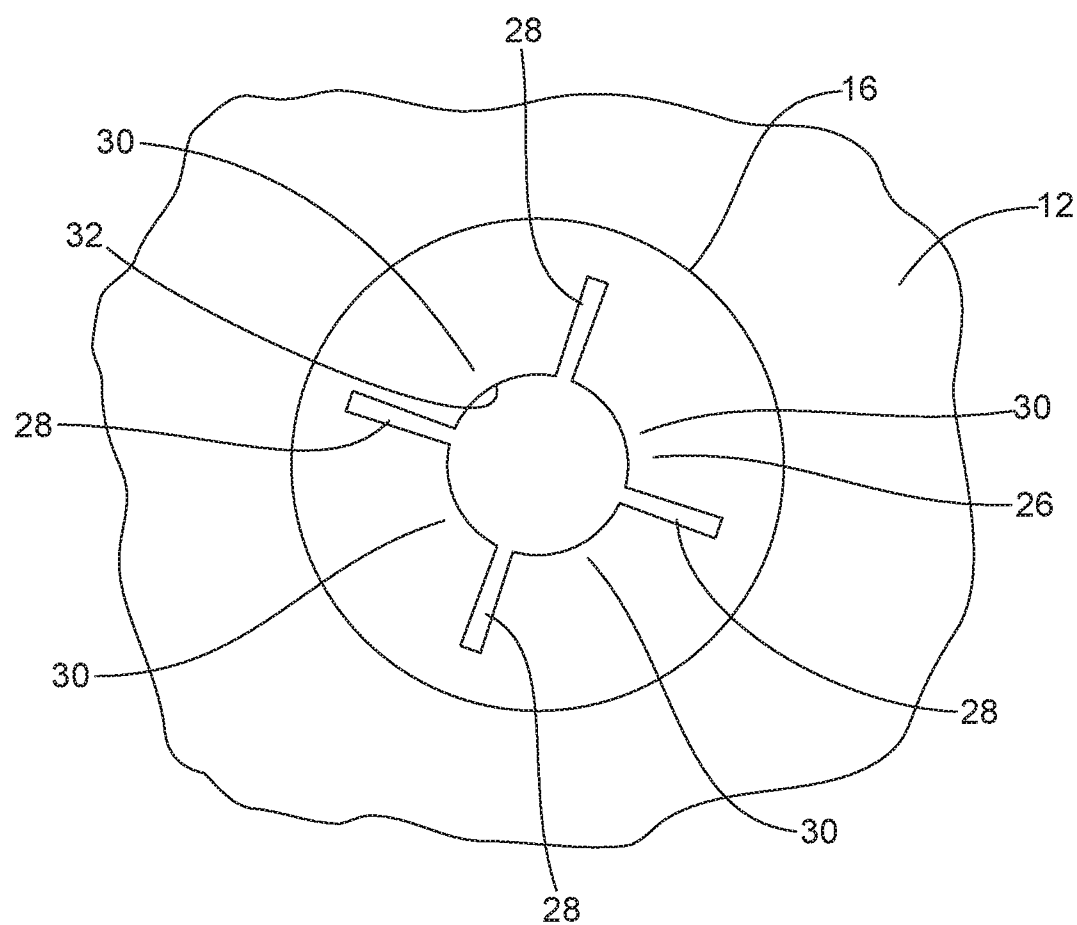

As illustrated in FIG. 2*a*, the first serrated washer 14 is annular in shape. Further, the first serrated washer 14 includes a first inner margin 18 having a first plurality of spaced slits 20 defining a first plurality of spaced teeth 22 encompassing first central aperture 24. As illustrated in FIG. 2*b*, the second serrated washer 16 includes a second inner margin 26 having a second plurality of spaced slits 28 defining a second plurality of spaced teeth 30 encompassing a second central aperture 32.

In the illustrated embodiment, the first serrated washer 14 includes four spaced slits 20 and four spaced teeth 22 and the second serrated washer 16 includes four spaced slits 28 and four spaced teeth 30. Here it should be appreciated that the number of slits 20, 28 and the number of teeth 22, 30 are not limited to four and as few as two slits and teeth and as many as four or more slits and teeth may be provided on each serrated washer 14, 16.

In the illustrated embodiment each of the resilient teeth 22, 30 define an equal arc of the associated central aperture 24 or 32. Here it should be appreciated that the plurality of teeth 22, 30 do not need to be of the same size and do not necessarily need to define an equal arc of the associated central aperture 24, 32.

The first and second serrated washers 14, 16 are fixed to the body 12 by any appropriate means including, for example, an appropriate adhesive or by stitching.

Figure 4:
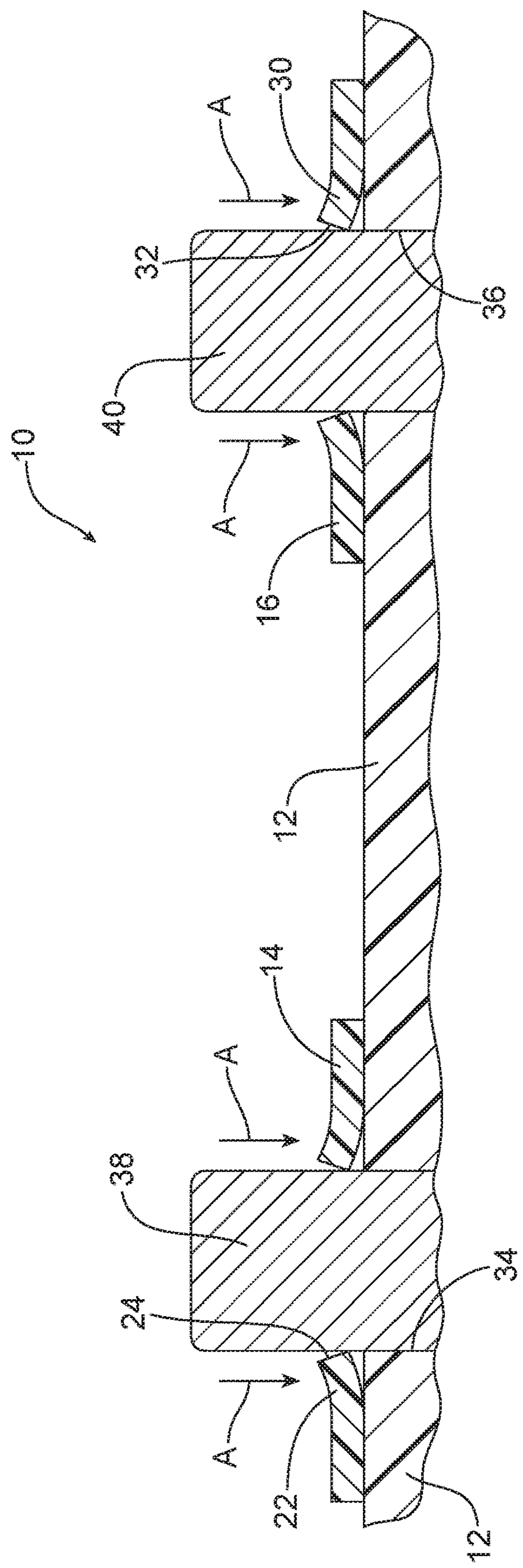
FIG. 4 is a cross-sectional view illustrating how the serrated washers illustrated in FIGS. 2*a* and 2*b* secure the acoustical absorber/shock tower insulator to two weld studs by providing a positive retention force.

More specifically, as best illustrated in FIG. 4, the body 12 includes a first mounting aperture 34 and a second mounting aperture 36. The first serrated washer 14 is fixed to the body 12 in a position around a first entrance to the first mounting aperture 34 with the first central aperture 24 aligned with the first mounting aperture. Similarly, the second serrated washer 16 is fixed to the body 12 around a second entrance to the second mounting aperture 36 with the second central aperture in the serrated washer 16 aligned with the second mounting aperture 36.

Figure 3:
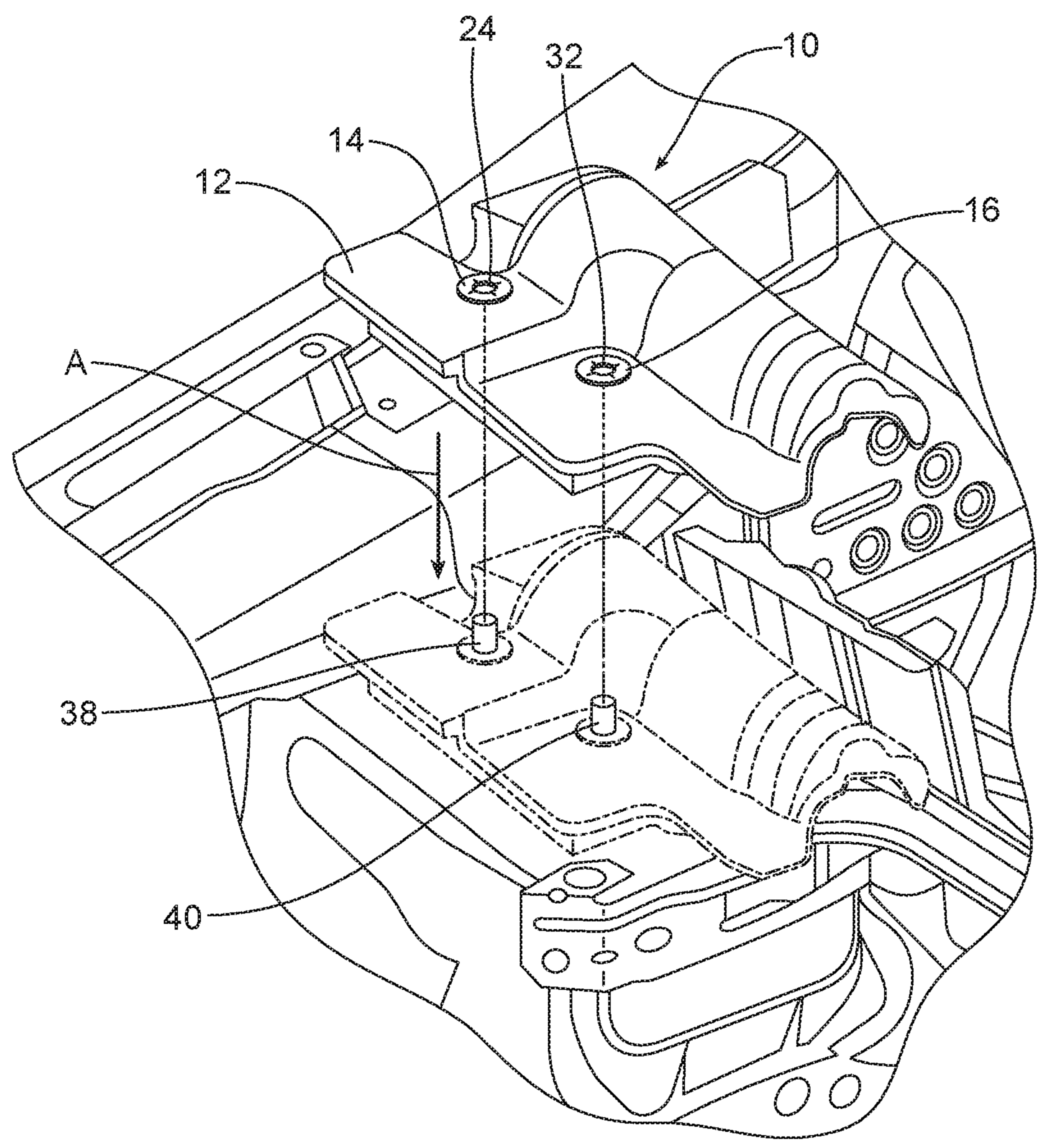
FIG. 3 is a perspective view illustrating how the shock tower insulator is aligned over the weld studs (note full line position) before being mounted over the shock tower (note phantom line position).

Reference is now made to FIG. 3 illustrating how the acoustical absorber 10 may be mounted onto two weld studs 38, 40 by means of the first serrated washer 14 and second serrated washer 16. This is done by positioning the acoustical absorber 10 over the weld studs 38, 40 so that the first mounting aperture 34 is aligned with the first weld stud 38 and the second mounting aperture 36 is aligned with the second weld stud 40. As should be appreciated, the weld stud 38 has a diameter that is slightly larger than the diameter of the first central aperture 24 in the first serrated washer 14 while the weld stud 40 has a diameter that is slightly larger than the second central aperture 32 and the second serrated washer 16.

Once the first and second mounting apertures 34, 36 are aligned with the respective first and second weld studs 38, 40, the body 12 is moved downward in the direction of action arrow A forcing the first inner margin 18 of the first serrated washer 14 and the second inner margin 26 of the second serrated washer 16 over the respective weld studs 38, 40. More specifically, the resilient teeth 22 of the first serrated washer 14 are flexed slightly and provide a positive retention force for holding the acoustical absorber 10 on the first weld stud 38 while the resilient teeth 30 of the second serrated washer 16 are flexed slightly and provide a positive retention force for holding the acoustical absorber on the weld stud 40. In this way the acoustical absorber 10 is maintained in a fully seated position shown in phantom line in FIG. 3 and full line in FIG. 4. That positive retention force may be on the order of at least 44 Newtons.

Numerous benefits are provided by the acoustical absorber 10. The acoustical absorber 10 incorporates two serrated washers 14, 16 that are fixed to the body 12 and function to secure and hold the acoustical absorber in a desired operating position. This eliminates the need for separate fasteners in many possible applications. This provides cost savings in materials and assembly time is reduced. Further, there is also no longer a need to maintain tool clearance for installing fasteners, allowing for more compact and less costly assemblies. This also frees designers to use the previously required clearance space for other, more useful purposes.

The foregoing has been presented for purposes of illustration and description. It is not intended to be exhaustive or to limit the embodiments to the precise form disclosed. Obvious modifications and variations are possible in light of the above teachings. While FIGS. 3 and 4 show the attachment of the acoustical absorber 10 to two weld studs 38, 40 by means of the serrated washers 14, 16 fixed to the body 12, it should be appreciated that the serrated washers could also be used to engage and hold an attachment point other than a weld stud. All such modifications and variations are within the scope of the appended claims when interpreted in accordance with the breadth to which they are fairly, legally and equitably entitled.

What is claimed:

1. An acoustical absorber, comprising:

a body made from a sound insulating material having a first material density $D_1$; and a first serrated washer made from a composite material having a second material density $D_2$ where $D_1<D_2$, wherein said first serrated washer is fixed directly to said body via an adhesive.

2. The acoustical absorber of claim 1, wherein said first serrated washer is annular in shape.

3. The acoustical absorber of claim 2, wherein said first serrated washer includes an inner margin having a plurality of spaced slits defining a plurality of spaced teeth encompassing a central aperture.

4. The acoustical absorber of claim 3, wherein said first serrated washer includes four spaced slits defining four resilient teeth.

5. The acoustical absorber of claim 4, wherein each resilient tooth of said four resilient teeth defines an equal arc of said central aperture.

6. The acoustical absorber of claim 5, further including a second serrated washer fixed to said body.

7. The acoustical absorber of claim 6, wherein said body includes (a) a first mounting aperture aligned with said central aperture of said first serrated washer and (b) a second mounting aperture aligned with a second central aperture in said second serrated washer.

8. A shock tower insulator, comprising:

a body made from a sound insulating material, said body including a first mounting aperture; and a first serrated washer fixed to said body around an entrance to said first mounting aperture, wherein said first serrated washer is made from a composite material, wherein said body has a first material density $D_1$ and said first serrated washer has a second material density $D_2$ where $D_1<D_2$.

9. The shock tower insulator of claim 8, further including a second serrated washer fixed to said body around a second entrance to a second mounting aperture in said body.

10. The shock tower insulator of claim 9, wherein said second serrated washer is made from a composite material.

11. The shock tower insulator of claim 10, wherein said second serrated washer has the second material density $D_2$.

12. The shock tower insulator of claim 11, wherein said first serrated washer and said second serrated washer are both annular in shape.

13. The shock tower insulator of claim 12, wherein (a) said first serrated washer includes a first inner margin having a first plurality of spaced teeth encompassing a first central aperture and (b) said second serrated washer includes a second inner margin having a second plurality of spaced teeth encompassing a second central aperture.

14. The shock tower insulator of claim 13, wherein first central aperture is aligned with said first mounting aperture and said second central aperture is aligned with said second mounting aperture.

15. The shock tower insulator of claim 14, wherein said body, said first serrated washer and said second serrated washer are all made from a polyester fiber material.

16. The shock tower insulator of claim 15, wherein said first serrated washer and said second serrated washer retain said body to a first mounting stud and a second mounting stud with a combined retention force of at least 44 Newtons.

* * * * *